(12) United States Patent
Gushwa et al.

(10) Patent No.: US 10,028,620 B2
(45) Date of Patent: Jul. 24, 2018

(54) DICING TOOL FOR DOMESTIC FOOD PROCESSING DEVICE

(71) Applicant: WHIRLPOOL CORPORATION, Benton Harbor, MI (US)

(72) Inventors: David J. Gushwa, Mishawaka, IN (US); Zachary A. Lownds, St. Joseph, MI (US); Jeffrey Carl Loebig, New Territories (HK); Euan Skinner Macleod, New Territories (HK); Leong Hin Yung, Tuen Mun (HK); James Fan Zhao, Guangdong (CN); Huang Yong Hang, Guangdong Province (CN)

(73) Assignee: Whirlpool Corporation, Benton Harbor, MI (US)

( * ) Notice: Subject to any disclaimer, the term of this patent is extended or adjusted under 35 U.S.C. 154(b) by 49 days.

(21) Appl. No.: 15/196,416

(22) Filed: Jun. 29, 2016

(65) Prior Publication Data

US 2016/0302619 A1  Oct. 20, 2016

Related U.S. Application Data

(62) Division of application No. 14/052,830, filed on Oct. 14, 2013, now Pat. No. 9,439,539.

(60) Provisional application No. 61/715,396, filed on Oct. 18, 2012.

(51) Int. Cl.
| | |
|---|---|
| *A47J 43/07* | (2006.01) |
| *B26D 3/18* | (2006.01) |
| *B26D 1/29* | (2006.01) |
| *B26D 3/26* | (2006.01) |

(52) U.S. Cl.
CPC ....... *A47J 43/0716* (2013.01); *A47J 43/0722* (2013.01); *B26D 1/29* (2013.01); *B26D 3/185* (2013.01); *B26D 3/26* (2013.01); *Y10T 83/222* (2015.04); *Y10T 83/9372* (2015.04); *Y10T 83/9495* (2015.04)

(58) Field of Classification Search
CPC ............... A47J 43/0722; A47J 43/0716; A47J 43/0727; B26D 3/18; B26D 3/185; B26D 3/26

See application file for complete search history.

(56) References Cited

U.S. PATENT DOCUMENTS

| | | |
|---|---|---|
| 4,190,208 A | 2/1980 | Schaeffer et al. |
| 4,199,112 A | 4/1980 | McClean |
| 4,256,265 A | 3/1981 | Madan |
| 5,445,332 A | 8/1995 | Shimizu et al. |
| 5,947,016 A | 9/1999 | Repac et al. |

(Continued)

FOREIGN PATENT DOCUMENTS

| | | | | |
|---|---|---|---|---|
| DE | 453590 C | * | 12/1927 | ............. B26D 3/185 |
| DE | 202012103248 U1 | * | 9/2012 | ............... B26D 1/28 |

(Continued)

*Primary Examiner* — Jennifer Swinney
(74) *Attorney, Agent, or Firm* — Price Heneveld LLP (57) ABSTRACT

A food processing device includes a dicing kit adapted to be received in a bowl which is coupled to a base. The dicing kit includes a dicing grid disposed within a frame which is coupled to a cover member having a rotating slicing tool disposed there between. The slicing tool is positively captured between the dicing grid frame and the cover member and is further adapted to rotate as powered by a motor disposed in the base portion of the food processor.

9 Claims, 8 Drawing Sheets

(56) References Cited

U.S. PATENT DOCUMENTS

| | | | |
|---|---|---|---|
| 6,604,455 B2 | 8/2003 | Areh et al. | |
| 6,805,312 B2 | 10/2004 | Capp | |
| 7,066,082 B2 | 6/2006 | O'Loughlin | |
| 7,122,820 B2 | 10/2006 | Engel et al. | |
| 7,263,926 B2 | 9/2007 | Chang Chien | |
| 8,051,769 B2 | 11/2011 | Conti et al. | |
| 8,122,820 B2 * | 2/2012 | Conti | A47J 43/0711 241/101.01 |
| 8,215,231 B2 | 7/2012 | Bigge et al. | |
| 8,250,959 B2 * | 8/2012 | Beber | A47J 43/0716 83/857 |
| 8,677,895 B2 * | 3/2014 | Beber | A47J 43/0711 241/101.1 |
| 8,702,300 B2 * | 4/2014 | Audette | A47J 43/0777 241/282.1 |
| 9,770,134 B2 * | 9/2017 | Unteregger | B26D 3/22 |
| 2004/0060414 A1 | 4/2004 | Sundqvist | |
| 2008/0271614 A1 | 11/2008 | Chan | |
| 2009/0301319 A1 | 12/2009 | Bigge et al. | |
| 2010/0154658 A1 | 6/2010 | Conti et al. | |
| 2010/0154659 A1 | 6/2010 | Gushwa et al. | |
| 2011/0011421 A1 | 1/2011 | Dumas et al. | |
| 2011/0049279 A1 | 3/2011 | Beber et al. | |

FOREIGN PATENT DOCUMENTS

| | | | |
|---|---|---|---|
| EP | 2772162 A1 * | 9/2014 | A47J 43/07 |
| FR | 2548573 A1 * | 1/1985 | B26D 3/18 |
| FR | 2872399 A1 * | 1/2006 | A47J 43/0722 |
| FR | 2959154 A1 * | 10/2011 | A47J 43/0722 |
| WO | 2004026093 A1 | 4/2004 | |
| WO | 2010012727 A1 | 2/2010 | |

\* cited by examiner

DICING TOOL FOR DOMESTIC FOOD PROCESSING DEVICE

CROSS-REFERENCE TO RELATED APPLICATION

The present application represents a divisional of and claims priority to U.S. patent application Ser. No. 14/052,830 (now U.S. Pat. No. 9,439,539) entitled "DICING TOOL FOR DOMESTIC FOOD PROCESSING DEVICE" filed Oct. 14, 2013, which is incorporated herein by reference in its entirety. This application also claims priority to U.S. Provisional Application No. 61/715,396, filed on Oct. 18, 2012, entitled "DICING TOOL FOR DOMESTIC FOOD PROCESSING DEVICE," the disclosure of which is hereby incorporated herein by reference in its entirety.

FIELD OF THE INVENTION

The present invention relates to electrical appliances for processing food items, and more particularly, to a food processing device having a dicing feature, wherein a cover member is used to retain a rotary slicing blade on a dicing grid to define a dicing tool assembly

BACKGROUND OF THE INVENTION

Food processors are generally used to prepare food items by conducting a processing operation, such as slicing, dicing, grating, or shredding of a food substrate. Generally, non-commercial or domestic food processors require some type of manual operation to process food, particularly when using a dicing process. Commercial machines are known to have motor-operated dicing features, however, these commercial systems use high powered high torque motors, such that a motor-operated non-commercial food processor that is capable of performing a dicing procedure is generally not known. Commercial systems used to perform a dicing procedure will generally secure a blade to the commercial processor with a screw-type retainer assembly which is not conducive to domestic food processing. Thus, a need exists for a food processing assembly that does not require manual operation, is easily assembled and disassembled, and is capable of providing a motor-driven dicing procedure.

SUMMARY OF THE PRESENT INVENTION

One aspect of the present invention includes a food processor having a bowl assembly which includes a landing portion. The bowl assembly is configured to receive processed food. An upper housing is configured to receive food for processing and is in communication with the bowl assembly to at least partially define a food processing path. A carrier member is supported on the landing portion of the bowl assembly and includes a dicing grid disposed along the food processing path. A cover member is operably coupled to the frame member to define a food processing chamber between the cover member and the frame member. A cutting tool is disposed within the food processing chamber between the frame member and the cover member and is selectively movable through the food processing path to cut food as it passes through the food processing path. A drive mechanism is coupled to the cutting tool to rotate the cutting tool within the food processing chamber.

Another aspect of the present invention includes a food processor comprising a bowl assembly, wherein the bowl assembly includes an upper coupling portion and a lower coupling portion. The bowl assembly defines a receptacle configured to receive processed food in assembly. An upper housing is removably mounted to the upper coupling portion of the bowl assembly, and along with the bowl assembly, the upper housing defines a food processing path along which the receptacle is located. A base is coupled to the lower coupling portion of the bowl assembly and houses a motor which is adapted to rotatably drive an output drive shaft. A dicing tool assembly includes a carrier member, a cover member, and a cutting tool which are coupled together such that the cutting tool is positively captured between the carrier member and the cover member. The carrier member includes a dicing grid disposed along the food processing path. In assembly, the carrier member is supported on the upper coupling portion of the bowl assembly. The cover member is operably coupled to the carrier member to define a food processing chamber in which the cutting tool is disposed. The cutting tool is selectively movable through the food processing path to cut food as it passes through the food processing path.

Yet another aspect of the present invention includes a dicing tool assembly including a carrier member and a dicing grid received in the carrier member along a food processing path. The dicing grid includes multiple dicing elements defining multiple dicing openings through which a food substrate may pass. A cover member is coupled to the carrier member in a generally spaced-apart relationship to define a food processing chamber. A cutting tool is disposed within the food processing chamber and is selectively movable through the food processing path to cut the food substrate as it passes through the food processing path.

These and other aspects, objects, and features of the present invention will be understood and appreciated by those skilled in the art upon studying the following specification, claims, and appended drawings.

DETAILED DESCRIPTION OF THE EMBODIMENTS

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
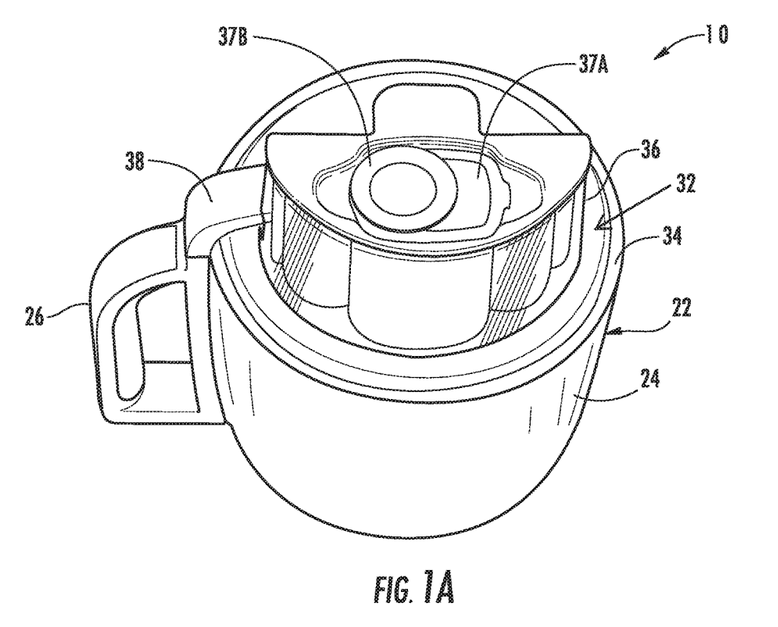
FIG. 1A is a perspective view of a food processor according to one aspect of the present invention.
Figure 1B:
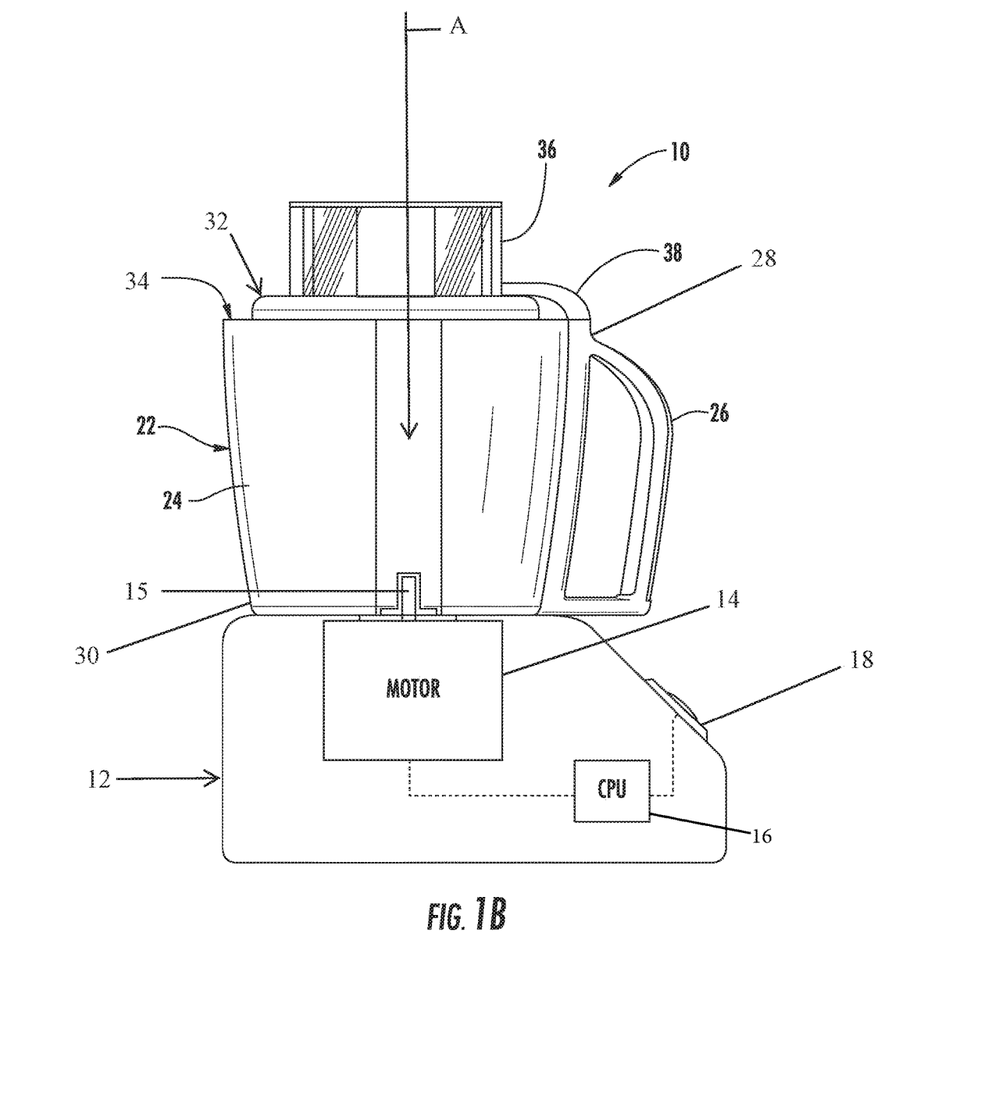
FIG. 1B is a schematic view of the food processor of FIG. 1 as mounted on a base showing a food processing path and its relationship with a dicing tool assembly.

Referring to FIGS. 1A and 1B, the reference numeral 10 generally designates a food processor according to one embodiment of the present invention. The food processor 10 shares many features of a conventional food processor which will not be described in detail herein, except as necessary for a complete understanding of the present invention. The food processor 10, as shown in FIG. 1B, includes a base 12 having a motor 14, as well as a controller 16 and a user interface 18. In use, the controller 16 is electrically coupled to the user interface 18 which may include controls such as dials, light, switches and displays, thereby enabling a user to control the operation of the food processor 10. The motor 14 is electrically coupled to the controller 16, such that the food processor 10 may be preprogrammed with a number of different food processing options for selection by the user. The motor 14 is adapted to rotatably power a drive mechanism or output drive shaft 15, which in turn rotatably drives various cutting tools as further described below. As further shown in FIG. 1B, the food processor 10 also includes a food receptacle or bowl assembly 22 having an outer periphery wall 24 and a handle portion 26 extending outwardly therefrom. In assembly, the bowl assembly 22 is configured to receive processed food. The bowl assembly 22 further includes an upper coupling portion 28 and a lower coupling portion 30, wherein the lower coupling portion 30 is adapted to couple the bowl assembly 22 to the base 12 using a snap-fit or twist-lock style arrangement. Similarly, the upper coupling portion 28 of the bowl assembly 22 is adapted to couple to an upper housing 32 at a lip portion 34 disposed on a lower portion of the upper housing 32. The upper housing 32 further includes a feed chute 36 which extends upwardly from the lower portion 34 of the upper housing 32, and which further includes first and second food pushers 37A and 37B. The feed chute 36 is adapted to receive food for processing. The upper housing 32 and bowl assembly 22 are in communication with one another, and together at least partially define a food processing path from the upper housing 32 to the bowl assembly 22 as indicated by arrow A.

Figure 2:
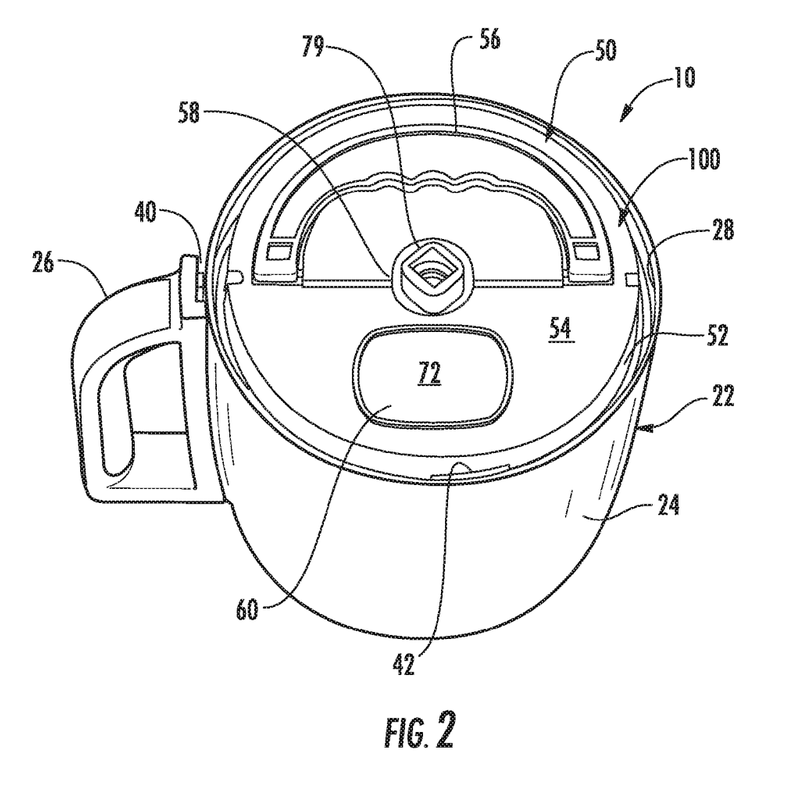
FIG. 2 is a perspective view of the food processor of FIG. 1 with an upper housing removed.

While the upper and lower coupling portions 28, 30 of the bowl assembly 22 are described above as being a twist-lock or a snap-fit type engagement, other forms of engagement are contemplated to couple the bowl assembly 22 to either the base 12 or the upper housing 32. The upper housing 32 further includes an engagement feature 38 which is adapted to lock or otherwise retain the upper housing 32 in place on the bowl assembly 22 using a corresponding engagement feature 40 disposed near the handle portion 26 as shown in FIG. 2. Other engagement features, such as tab 42, are also disposed along the upper coupling portion 28 of the bowl 20. Regarding FIG. 2, the food processor 10 is shown with the upper housing 32, shown in FIG. 1A, removed, thereby revealing a cover member 50 which is shown being received in the upper coupling portion 28 of the bowl assembly 22. The cover member 50 includes a coupling portion 52 which is adapted to couple to a frame or carrier member as further described below. The cover member 50 further includes a generally planar body portion 54 having a handle member 56 pivotally coupled thereto. In use, the handle member 56 is engaged by the user for removing the cover member 50, and further for removing a dicing tool assembly 100 as further described below. A central aperture 58 is generally disposed at a central location on the planar body portion 54 and provides access to a locating and coupling hub 79 for the upper housing assembly 32. An opening or feed aperture 60 is disposed through the planar body portion 54 of the cover member 50 and is adapted to align with the feed chute 36 of the upper housing 32 in assembly. The cover member 50 defines, in part, the dicing tool assembly 100 used to dice a food substrate as used with the food processor 10 of the present invention.

Figure 3:
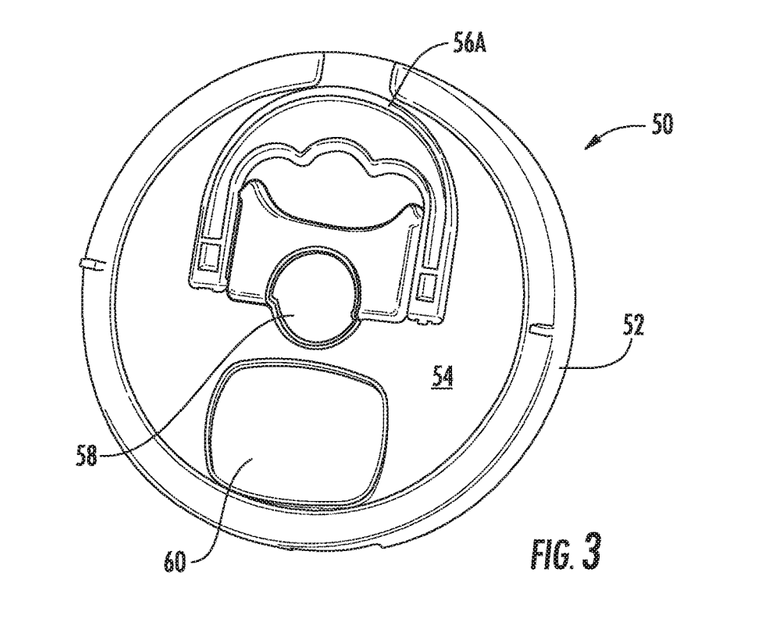
FIG. 3 is a perspective view of a cover member.
Figure 4:
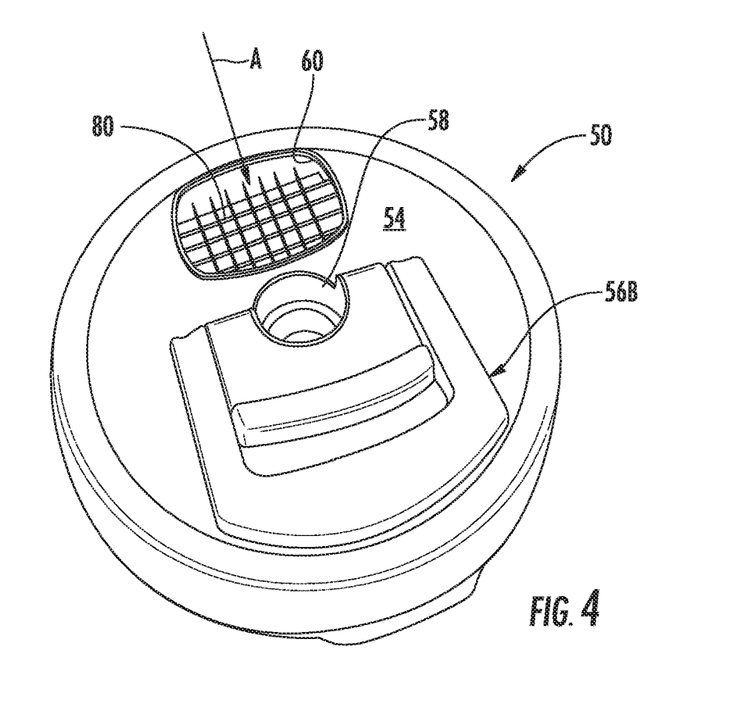
FIG. 4 is a perspective view of another embodiment of a cover member as coupled to a dicing grid.

As noted above, the cover member 50 is received in the upper coupling portion 28 of the bowl assembly 22 and serves to close the upwardly opening top portion of the bowl assembly 22. Feed aperture 60 is disposed within the food processing path A as shown in FIG. 1B. Referring now to FIG. 3, the cover member 50 is shown having a lower profile version of the handle member which is generally indicated as reference numeral 56A. Referring now to FIG. 4, another embodiment of a handle member 56B is shown as pivotally coupled to the cover member 50. As further shown in FIG. 4, a dicing grid 80 is shown disposed below feed aperture 60 such that the dicing grid 80 is also configured to be located along the food processing path A. The dicing grid 80 also defines, in part, the dicing tool assembly 100 (FIG. 2) as further described below.

Figure 5:
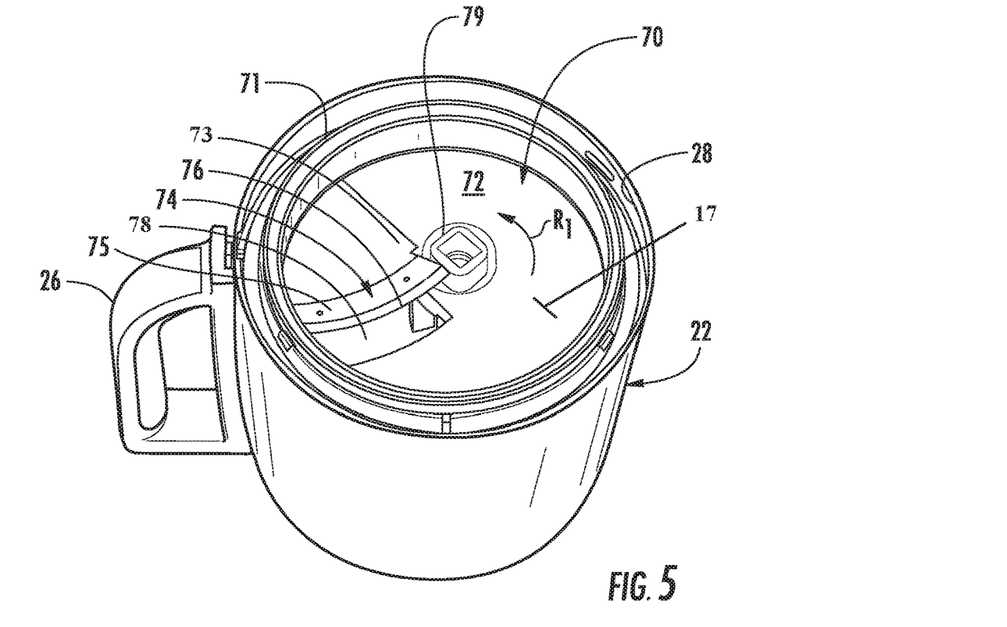
FIG. 5 is a perspective view of the food processor of FIG. 2 with the cover member removed.

Referring now to FIG. 5, the food processor 10 is shown with the cover member 50 removed, such that a cutting tool 70 is revealed. The cutting tool 70 is shown in the form of a slicing disc having a generally planar body portion 72 and a generally straight or horizontal cutting assembly 74 which is spaced-apart a predetermined distance from the planar body portion 72 by a ramped portion 73. The cutting assembly 74 generally includes a blade member 75 having a leading edge 76. The blade member 75 is disposed over an aperture 78 which is disposed through the generally planar body portion 72 of the cutting tool 70. The cutting tool 70 further includes a coupling hub 79 which is adapted to be received within central aperture 58 disposed on the cover member 50 in assembly as shown in FIG. 2. The coupling hub 79 is adapted to couple to the output drive shaft 15 for rotating the cutting tool 70 along a path as indicated by arrow $R_1$. In this way, the cutting tool 70 is powered by the motor 14 disposed within the base 12 of the food processor 10. As the cutting tool 70 is rotated along the rotational path indicated by arrow $R_1$, the cutting assembly 74 passes through the food processing path A, thereby processing a food substrate into food slices. The ramped portion 73, which connects the blade member 75 to the planar body portion 72 of the cutting tool 70, is adapted to urge food slices sliced by the blade member 75 downwardly towards the dicing grid 80 which is disposed below the cutting tool 70 in assembly. In this way, the ramped portion 73 is a trailing ramp to the blade member 75 which serves to push sliced food through the dicing grid 80 to produce a cubed or diced food substrate. Thus, the present invention provides a household food processor 10 which includes a motorized dicing tool assembly 100 for dicing a food substrate.

Figure 6:
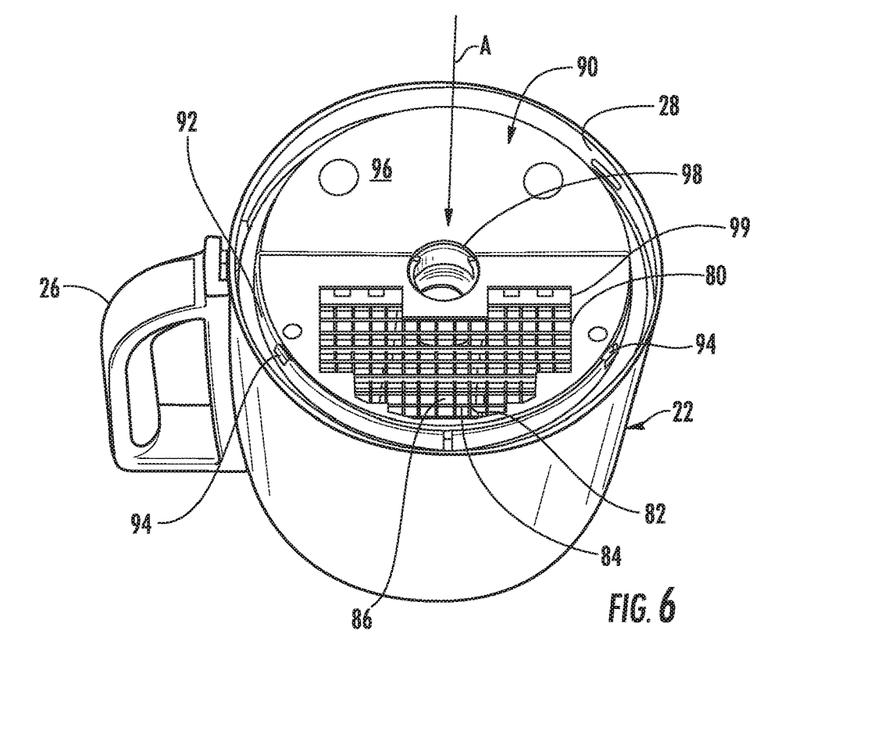
FIG. 6 is a perspective view of the food processor of FIG. 5 with a cutting tool removed.

Referring now to FIG. 6, a frame or carrier member 90 is shown having a coupling portion 92 with one or more attachment features 94 disposed thereon. The coupling portion 92 extends downwardly from a generally planar body portion 96 having a central aperture 98 disposed there through. In assembly, the central aperture 98 is adapted to align with central aperture 58 disposed on the cover member 50. The carrier member 90 further includes an aperture 99 which is disposed through the generally planar body portion 96. Aperture 99 couples to and supports the dicing grid 80 in the food processing path A. Along with the cover member 50 and cutting tool 70, the carrier member 90 and dicing grid 80 cooperate to define a complete dicing tool assembly 100. In assembly, the carrier member 90 and dicing grid 80 are received within the upper portion 28 of the bowl assembly 22 and the cutting tool 70 is then disposed there above. The cover member 50 is then coupled to the frame or carrier member 90 by coupling portion 52 of the cover member 50 to coupling portion 92 of the frame or carrier member 90. In this way, the carrier member 90 and cover member 50 define a food processing chamber 17 disposed between the cover member 50 and carrier member 90. Thus, the dicing grid 80 is located in the food processing path A and further, the cutting tool 70 selectively rotates through the food processing path A in the food processing chamber 17. As further shown in FIG. 6, the dicing grid 80 includes a plurality of cutting members of dicing elements 82, 84 which are substantially perpendicular to one another, thereby forming a plurality of openings or square slots 86. Thus, as food slices are urged through the square slots 86 of the dicing grid 80, a cubed or diced food substrate is provided. As coupled to the cover member 50, the carrier member 90 and dicing grid 80 can be removed from the bowl assembly 22 as the cover member 50 is removed by a user engaging the handle portion 56 disposed on the planar body portion 54 of the cover member 50. Thus, the dicing tool assembly 100 can be removed as a complete unit to expose processed food pieces received in the bowl assembly 22.

Figure 7:
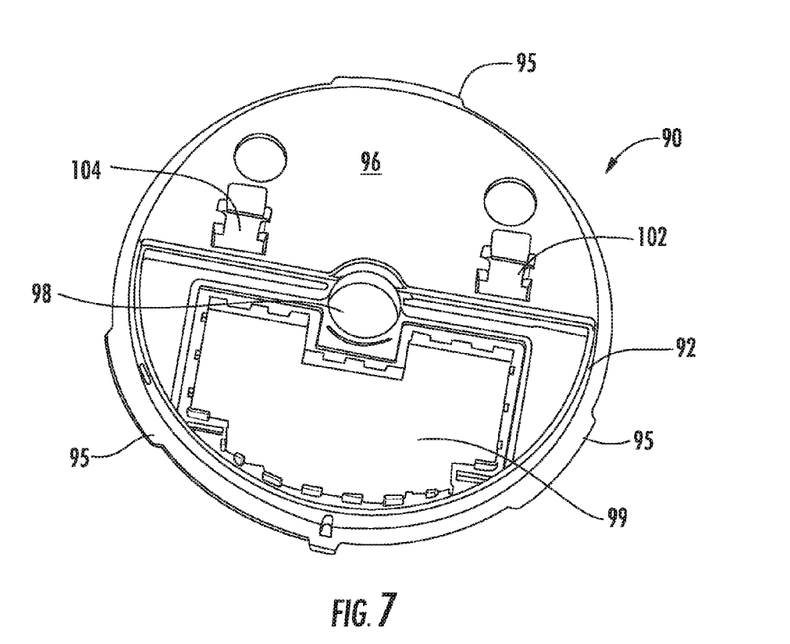
FIG. 7 is a perspective view of a carrier member.
Figure 8:
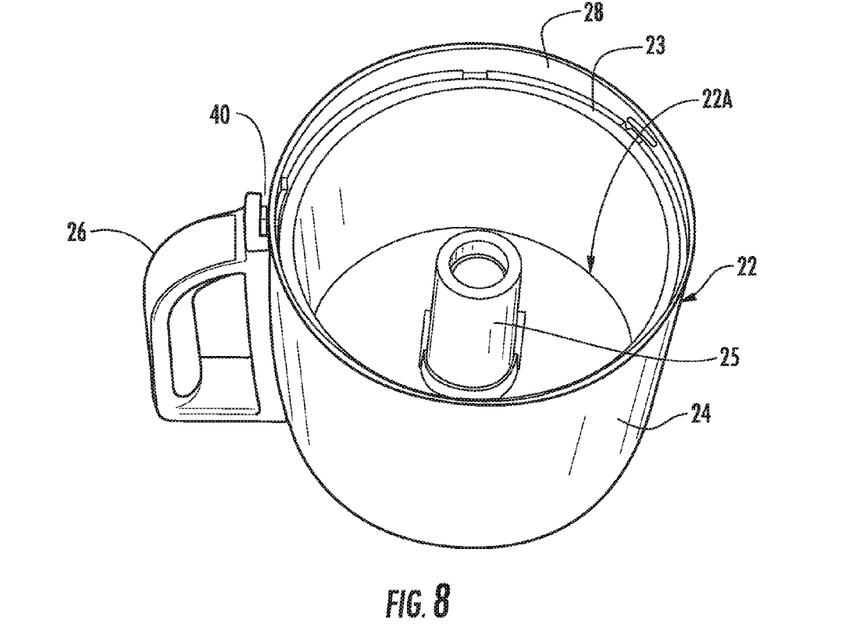
FIG. 8 is perspective view of a bowl assembly.
Figure 9:
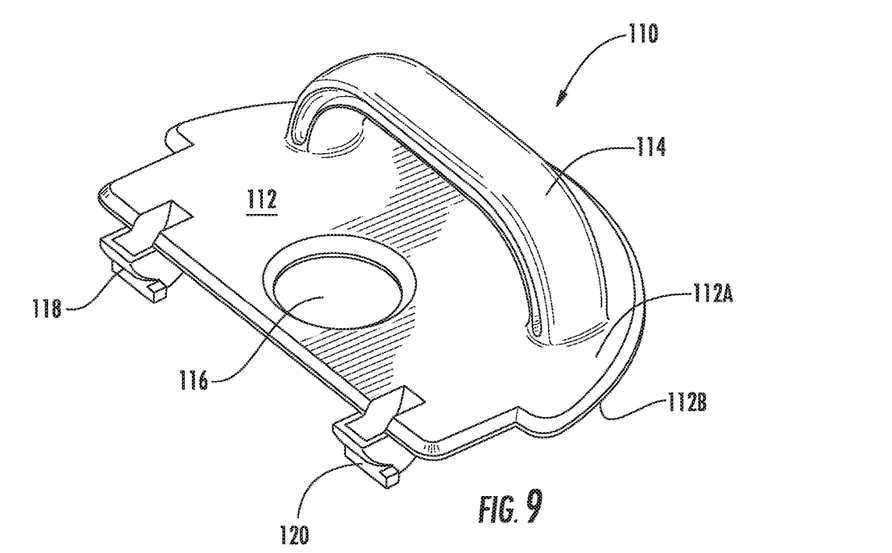
FIGS. 9-11 are perspective views of a cleaning tool.
Figure 10:
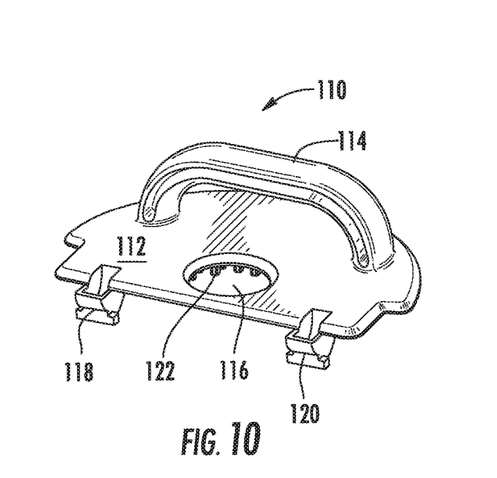

Referring now to FIG. 7, the frame or carrier member 90 is shown from a bottom view having a pair of slots or coupling members 102, 104 which are adapted to pivotally couple a cleaning tool to the carrier member 90 as further described below. The carrier member 90 further includes tabs 95 which are adapted to abut the bowl assembly 22 at a landing portion 23 disposed within a food collection receptacle 22A of the bowl assembly 22 as shown in FIG. 8. The tabs or flanges 95 are configured to ensure that the carrier member 90 does not rotate as received and supported on the landing portion 23 of the bowl assembly 22. As further shown in FIG. 8, an output shaft housing 25 is disposed within a central portion of the receptacle 22A such that the output shaft 15, coupled with the motor 14, can extend through the bowl assembly 22 to power and rotate the cutting tool 70 without interference. Thus, the dicing tool assembly 100 is abuttingly supported on the landing portion 23 of the bowl assembly 22 as shown in FIG. 2 and then positively captured between the bowl assembly 22 and the upper housing 32 by coupling the upper housing 32 to the bowl assembly 22.

The dicing tool assembly 100 is shown in an assembled condition in FIG. 2. The dicing tool assembly 100 is assembled by the carrier member 90 being received on the landing 23 of the bowl assembly 22, as shown in FIG. 6. The cutting tool 70 is then rotatably received on the carrier member 90 as supported by the bowl assembly 22. The cover member 50 is then coupled to the carrier member 90, as shown in FIG. 2, to form the assembled dicing tool assembly 100, wherein the cutting tool 70 is essentially sandwiched, or positively captured, between the cover member 50 and carrier member 90 as coupled together. The cutting tool 70, as noted above, is movable along a rotational axis $R_1$, as shown in FIG. 5, in the food processing chamber 17 defined between the carrier member 90 and the cover member 50. As further shown in FIG. 5, the cutting tool 70 includes an upwardly extending perimeter wall 71 having a rolled flange portion 77 which is adapted to abut an underside of the planar body portion 54 of the cover member 50 in assembly. In this way, as a sliced food substrate is urged by the ramped portion 73 of the cutting assembly 74 towards the dicing grid 80, the cutting tool 70 will remain in place and be retained by the cover member 50 as the food slices apply an upward force to the cutting tool 70. In this way, the cutting tool 70 rotates on the rotational axis $R_1$ and abuts the underside of the planar portion 54 of the cover member 50, such that the cutting tool 70 does not displace during the interaction of cutting tool 70 with a food substrate, but rather urges the food substrate using the ramped portion 30 towards and through the dicing grid 80. The cutting tool 70 is further held in place by the pivotal connection between the coupling hub 79 and the upper housing 32 as shown in FIG. 1B. As noted above, the assembled dicing tool 100 is removed from the bowl assembly 22 by using the handle 56 disposed on the cover member 50. The dicing tool 100 can then be disassembled for cleaning or for exchanging of parts, such as slicing discs of varying thicknesses, or dicing grids of varying dimensions.

Figure 11:
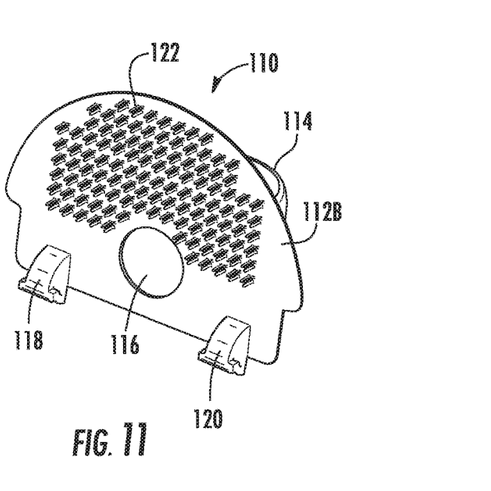
Figure 12:
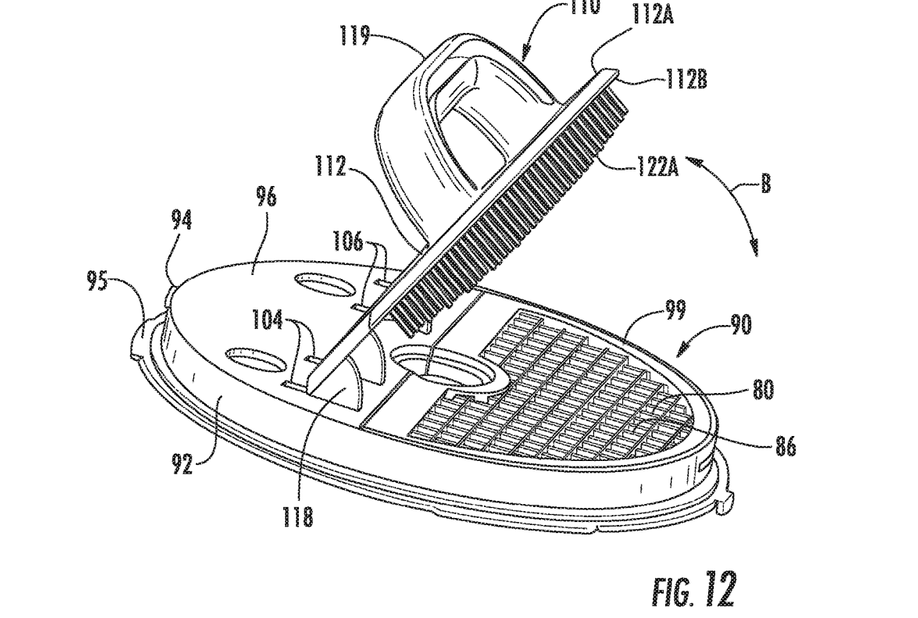
FIG. 12 is a perspective view of the cleaning tool of FIGS. 9-11 as secured to the carrier member of FIG. 7.
Figure 13:
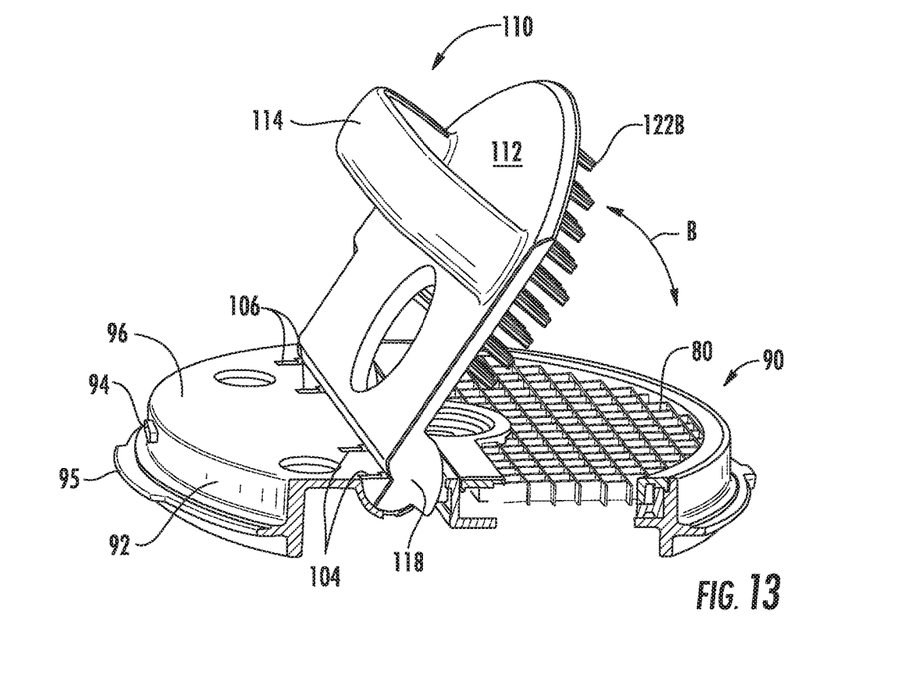
FIG. 13 is a cross-sectional perspective view of the cleaning tool and carrier member of FIG. 12.

Referring now to FIGS. 9-13, the carrier member 90 may further include a removable cleaning tool 110 having a body portion 112 which is shown in a generally semicircular configuration such that the cleaning tool 110 is substantially similar in configuration to a portion of the carrier member 90. A handle portion 114 extends upwardly from the planar body portion 112 of the cleaning tool 110 for engaging the cleaning tool 110. An aperture 116 as disposed through the planar body portion 112 to accommodate for attachment features, such as coupling hub 79 of the slicing tool 70 in assembly. Pivotal coupling members 118, 120 are adapted to engage the coupling apertures or slots 102, 104 disposed on the planar body portion 96 of the carrier 90 as best shown in FIGS. 12 and 13. The cleaning tool 110 includes upper and lower sides 112A, 112B of the planar body portion 112, wherein the lower side 112B includes a plurality of evenly spaced apart ribs 122 which, as shown in the embodiment of FIG. 11, have a generally cross-shaped cross-section. The plurality of ribs 122 are adapted to clear food particles from the dicing grid 80 as further described below. Specifically referring to FIGS. 12 and 13, the cleaning tool 110 is shown pivotally coupled to the carrier member 90, such that the cleaning tool 110 is operable between open and closed positions along a path as indicated by arrow B. In the closed position, the protrusions or ribs 122 engage the square slots 86 of the dicing grid 80 to clear any food particles therefrom. As shown in FIGS. 12 and 13, the ribs 122 may include a bristle-like configuration 122A or a tapered configured 122B. As further shown in FIG. 13, the pivotal coupling portion 118 is engaged with pivotal slot or aperture 104 of the body portion 96 of carrier member 90 to pivotally support the cleaning tool 110 between the open and closed positions. Thus, in use, the cover member 50 can be removed from the carrier member 90 and the slicing disc 70 also removed to expose the planar body portion 96 of the carrier member 90. The cleaning tool 110 can then be coupled to the carrier member 90 and used to clean out the square slots 86 of the dicing grid 80 using the pivotal movement noted above. Depending on the configuration of the dicing grid 80, food particles can easily become lodged in the dicing grid and later urged to the receptacle 22A of the bowl assembly 22 when additional food slices are urged through the dicing grid 80. The cleaning tool 110 offers a convenient cleaning feature which efficiently engages each individual square slot 86 of the dicing grid 80 in a mechanical way so as to dislodge any food particles that become wedged in the dicing grid 80.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A food processor comprising:
    a bowl assembly having a landing portion, the bowl assembly configured to receive processed food;
    an upper housing configured to receive food for processing and in communication with the bowl assembly to at least partially define a food processing path from the upper housing to the bowl assembly;
    a carrier member supported on the landing portion of the bowl assembly, wherein the carrier member includes a body portion;
    a cleaning tool pivotally supported on the body portion of the carrier member, wherein the cleaning tool includes a plurality of ribs and is operable between open and closed positions;
    a dicing grid received in the carrier member and disposed along the food processing path, wherein the plurality of ribs of the cleaning tool are received within slots defined along the dicing grid when the cleaning tool is in the closed position;
    a cover member operably coupled to the carrier member to define a food processing chamber between the cover member and the carrier member;
    a cutting tool disposed within the food processing chamber between the carrier member and the cover member, the cutting tool selectively movable through the food processing path to cut food as it passes through the food processing path; and
    a drive mechanism coupled to the cutting tool to rotate the cutting tool within the food processing chamber.

2. The food processor of claim 1, wherein the cutting tool includes a planar body portion and a cutting assembly disposed on the planar body portion.

3. The food processor of claim 2, wherein the cutting assembly includes a blade member disposed on a ramped portion, the ramped portion adapted to support the blade member at a predetermined distance above the planar body portion.

4. The food processor of claim 3, wherein the ramped portion is adapted to urge food towards the dicing grid as the cutting tool rotates through the food processing path.

5. The food processor of claim 4, wherein the cutting tool is positively captured between the cover member and the carrier member to define a dicing tool assembly.

6. The food processor of claim 5, wherein the dicing tool assembly is positively captured between the upper housing and the bowl assembly.

7. The food processor of claim 5, wherein the dicing tool assembly is removable from the food processor by removing the upper housing to access the dicing tool.

8. The food processor of claim 1, wherein the cover member includes a body portion and a handle member pivotally supported on the body portion.

9. The food processor of claim 8, wherein the carrier member is removably coupled to the cover member.

* * * * *